United States Patent [19]

Erickson et al.

[11]  4,297,153

[45]  Oct. 27, 1981

[54] METHOD AND APPARATUS FOR MAKING DOLL CLOTHING AND DOLL HOUSE ACCESSORIES

[75] Inventors: Erick E. Erickson; Allison W. Katzman, both of Chicago; Jeffrey D. Breslow, Highland Park, all of Ill.

[73] Assignee: Marvin Glass & Associates, Chicago, Ill.

[21] Appl. No.: 160,917

[22] Filed: Jun. 19, 1980

Related U.S. Application Data

[63] Continuation-in-part of Ser. No. 10,806, Feb. 9, 1979, abandoned.

[51] Int. Cl.³ .................. B44C 3/02; B29C 13/04; A41D 1/00
[52] U.S. Cl. .................................. 156/63; 2/75; 46/115; 156/297; 264/138; 264/301; 264/304; 273/DIG. 5; 249/99; 249/184
[58] Field of Search .............. 264/138, 219, 301, 304, 264/309, DIG. 60, 290.2, 301; 425/DIG. 12, DIG. 14; 46/115; 2/75; 273/DIG. 5; 249/99, 184; 156/63, 297

[56] References Cited

U.S. PATENT DOCUMENTS

| | | | |
|---|---|---|---|
| 1,831,333 | 11/1931 | Watkins | 264/301 X |
| 2,045,830 | 6/1936 | Brundage | 46/115 |
| 2,283,238 | 5/1942 | Thompson | 264/301 X |
| 2,308,649 | 1/1943 | Dean | 264/304 X |
| 2,359,948 | 10/1944 | Tillotson | 264/301 X |
| 2,478,249 | 8/1949 | Culik | 264/301 X |
| 2,534,827 | 12/1950 | McTammany | 2/75 |
| 2,546,705 | 3/1951 | Strawinski | 428/511 X |
| 2,707,281 | 5/1955 | Barth | 264/301 X |
| 2,867,560 | 1/1959 | Strawinski | 264/290.2 X |
| 3,026,635 | 3/1962 | Slade | 264/DIG. 60 |
| 3,048,511 | 8/1962 | Strawinski | 428/511 |
| 3,059,377 | 10/1962 | Brown et al. | 46/115 |
| 3,079,274 | 2/1963 | Marsden et al. | 264/301 |
| 3,135,648 | 6/1964 | Hawkins | 428/542 |
| 3,148,235 | 9/1964 | Velonis et al. | 264/301 |
| 3,206,533 | 9/1965 | Serra | 264/309 |
| 3,292,237 | 12/1966 | Fisher | 73/DIG. 5 |
| 3,298,987 | 1/1967 | Colgan et al. | 428/511 X |
| 3,438,808 | 4/1969 | Hawkins et al. | 428/511 |
| 3,702,844 | 11/1972 | Ofstead et al. | 428/511 |
| 3,859,125 | 1/1975 | Miller et al. | 428/511 |

FOREIGN PATENT DOCUMENTS

| | | | |
|---|---|---|---|
| 236569 | 12/1961 | Australia | 264/304 |
| 242402 | 10/1946 | Switzerland | 264/301 |

OTHER PUBLICATIONS

Washington Star, "Vinyl New for Young", Society--Home Section, Washington, D.C., Jul. 24, 1966, p. D-10.
Air Products Bulletin, "Vinol–Polyvinyl Alcohol Warp Sizing", Allentown, Pa., Air Products and Chemicals, Inc., 1978, 20 pp.
Air Products Bulletin, "Vinol Polyvinyl Alcohols", Allentown, Pa., Air Products and Chemicals, Inc., 1978, 6 pp.

*Primary Examiner*—Philip Anderson
*Attorney, Agent or Firm*—Mason, Kolehmainen, Rathburn & Wyss

[57] ABSTRACT

A method and apparatus for making doll clothing and doll house accessories includes a plurality of mold shapes or forms which are used to produce various articles of attire such as dresses, pants, and doll house furnishings such as cushions, curtains, rugs, flowers and many other items. Each of the garment molds may include detachable portions, such as the arms, to facilitate removing a finished article from the mold itself. The doll house accessories are made in generally flat molds which provide the texture and shape of the finished item. A viscous, liquid plastic is applied to the exterior surface of the mold by a brush or other tool to cover the exterior of the mold which defines the particular article. The liquid coating sets or solidifies to form a flexible article adapting the contours of the mold. The garment is then removed from the exterior of the mold.

15 Claims, 28 Drawing Figures

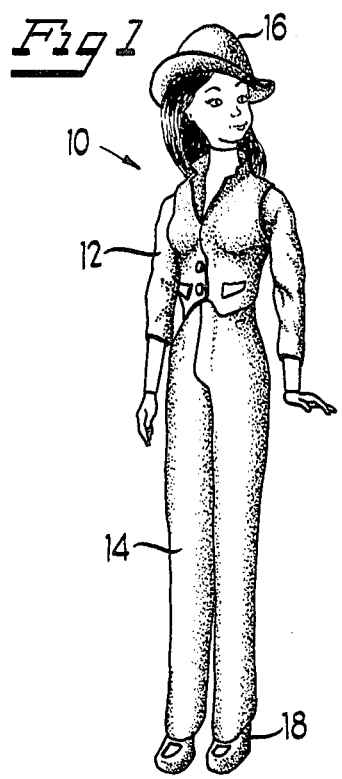
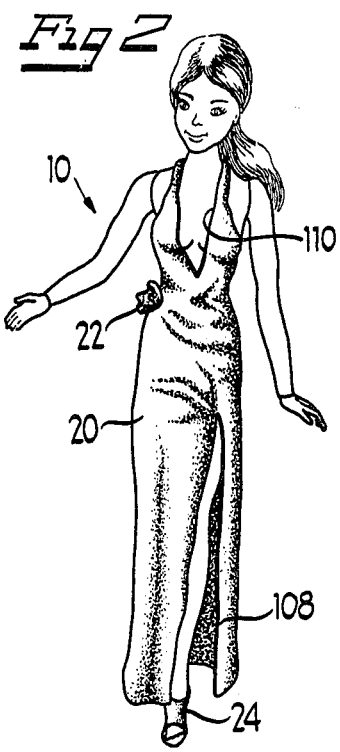
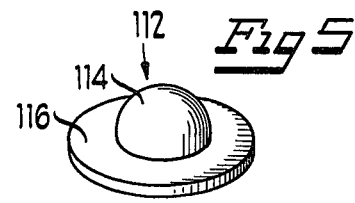
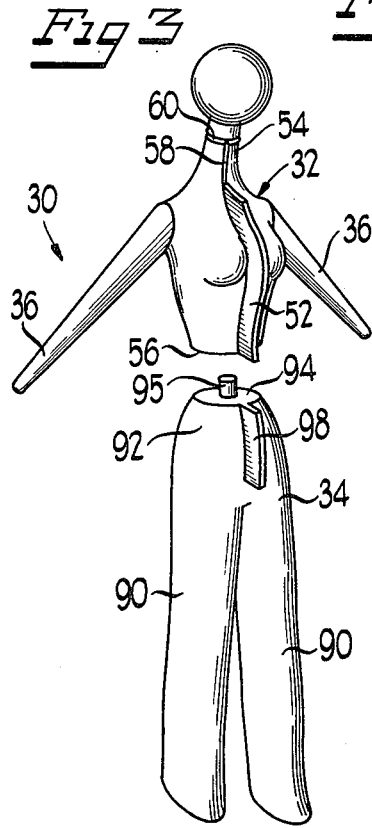
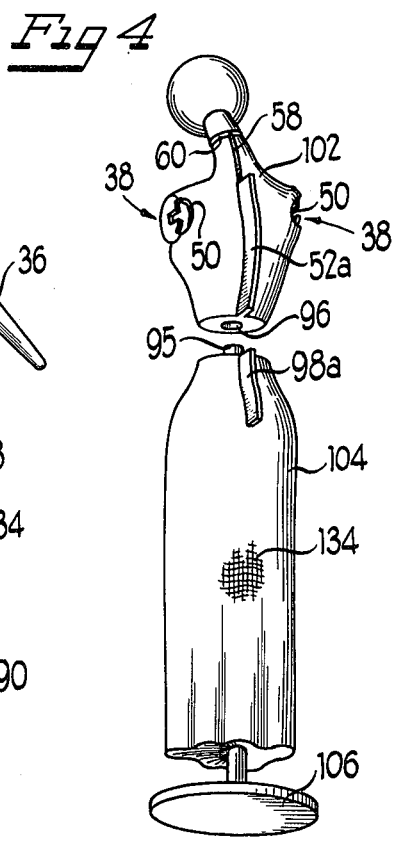
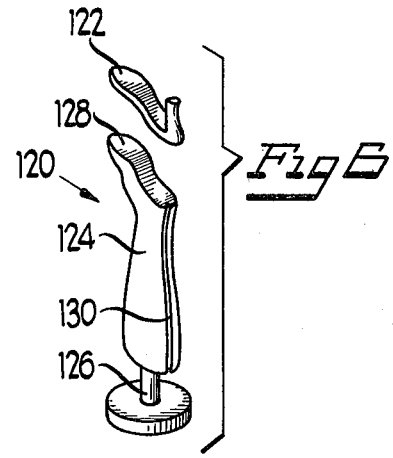
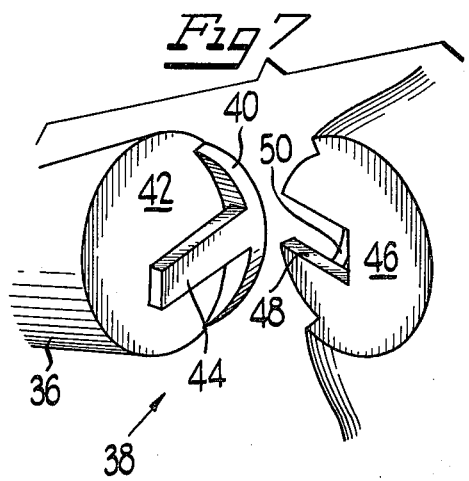

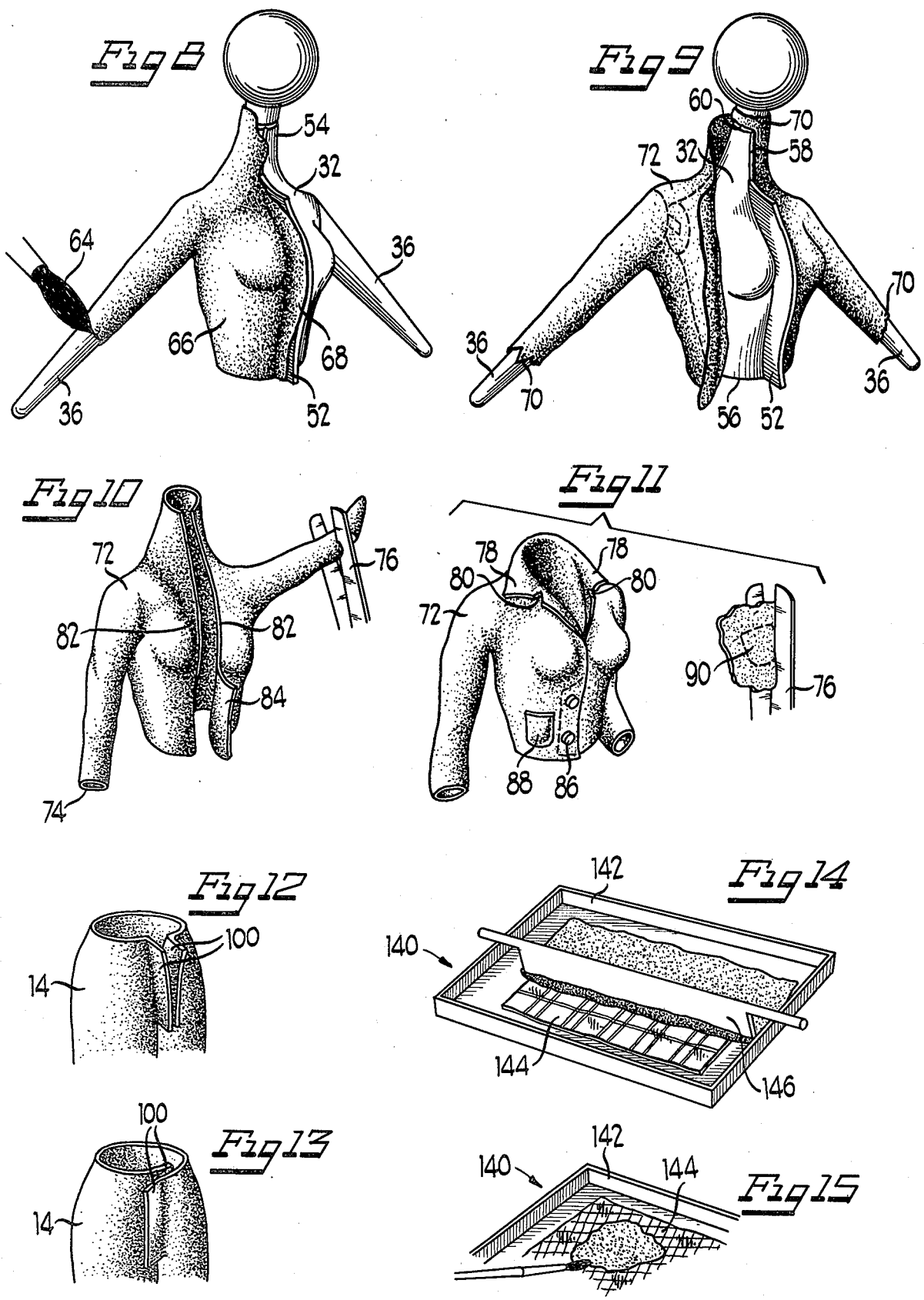

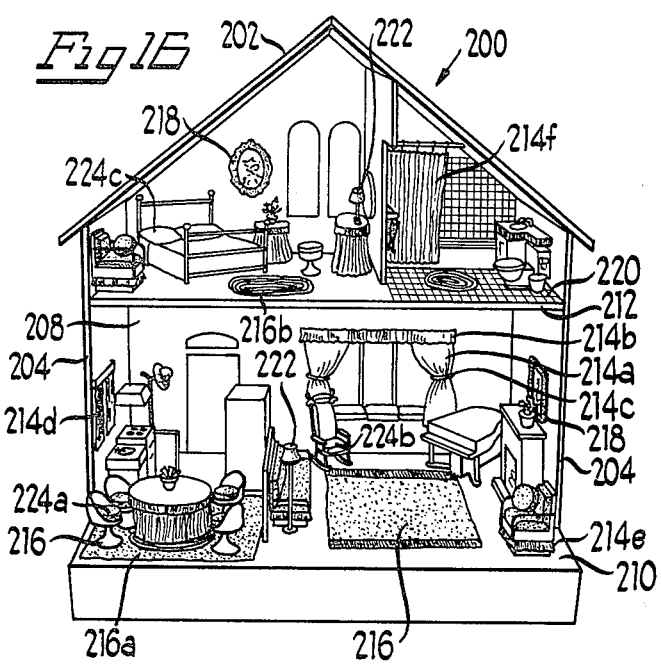
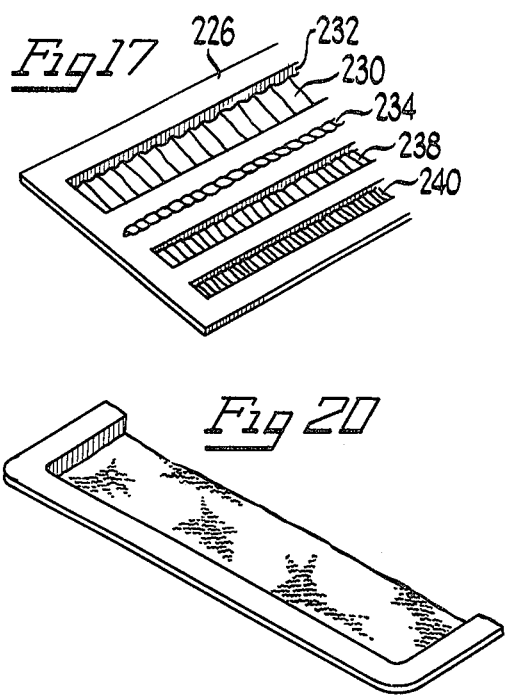
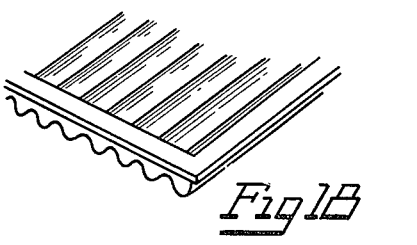
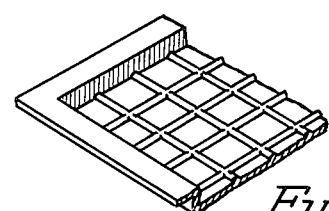
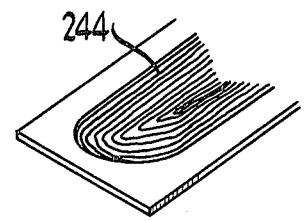
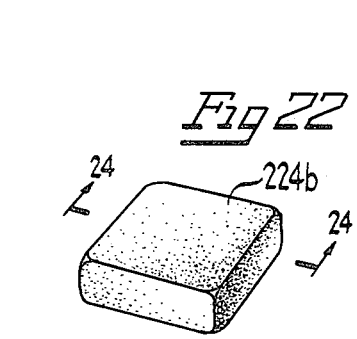
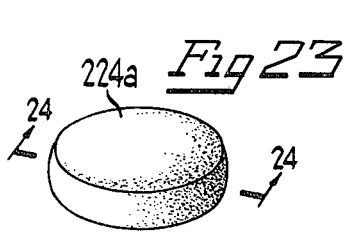
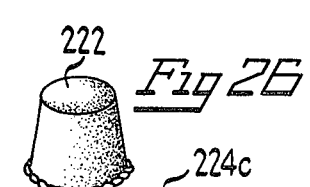
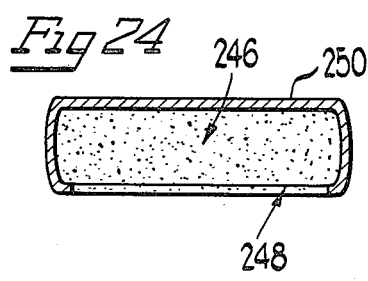
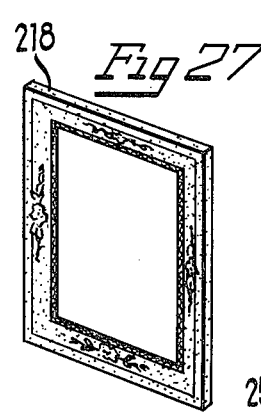
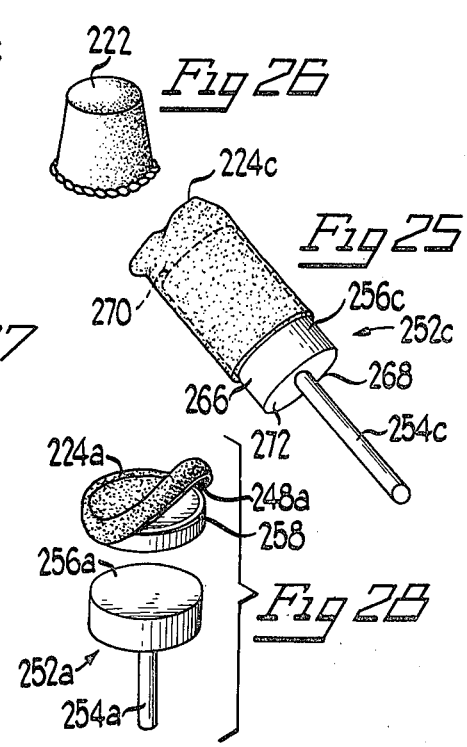
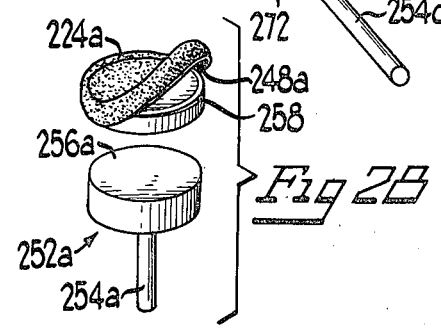

METHOD AND APPARATUS FOR MAKING DOLL CLOTHING AND DOLL HOUSE ACCESSORIES

CROSS-REFERENCE TO RELATED APPLICATION

This application is a continuation-in-part of copending U.S. patent application Ser. No. 010,806 filed on Feb. 9, 1979 now abandoned.

BACKGROUND OF THE INVENTION

1. Field of the Invention

The present invention relates to the manufacture of accessories for dolls and figure toys, and in particular, provides a method and apparatus for making doll clothing and doll house furnishings.

2. Brief Description of the Prior Art

In the past, most of the clothing which was provided for dolls and other figure toys, including stuffed animals, has been made in a conventional manner wherein small patterns are used to cut material pieces which are later sewn together. In addition, doll house furnishings were made on a piece by piece basis often in the same way full scale furnishings are made. Thus the production of doll accessories is a great time consuming process which is made additionally difficult by the small scale in which these articles are produced. This is especially true on very small dolls, for example, in the five to ten inch height range.

Various proposals have been made in which clothing or other articles have been made by applying a liquid coating or other thermo setting type material on the exterior of a mold which is designed to represent a particular portion of the anatomy. For example, it has been known to manufacture disposable, sanitary gloves by dipping a mold in a container of liquid latex material, such as shown in U.S. Pat. No. 3,494,989. The manufacture of other garments, particularly women's undergarments is shown in U.S. Pat. Nos. 2,707,281; 2,806,257; and 3,206,533. U.S. Pat. No. 2,588,571 shows a method of making boots.

SUMMARY OF THE INVENTION

An object of the present invention is to provide a new and simplified method and apparatus for producing doll clothing and doll house accessories.

In accordance with the above and other objects, the present invention provides a method and apparatus for making doll house accessories and doll clothing, particularly clothing of a size for dolls and figure toys. The invention includes a plurality of mold shapes or forms, generally similar in size to the article to be formed or to the doll to be clothed, which are used to produce various articles of attire such as dresses, pants, hats, shoes doll house accessories such as curtains, furniture, flooring, and many other items. Each of the individual clothing molds, preferably include detachable portions such as arms, legs and the like to facilitate removing of a finished article from the exterior of the mold. The method provides the application of a viscous, liquid plastic material to the exterior surface of the mold, by a brushing or other similar applicator to cover the entire exterior of the mold which defines the particular article. The liquid exterior is permitted to set or solidify to form a flexible article adapting the contours of the mold. The mold is then disassembled where necessary to remove the article from the exterior of the mold and trimmed to provide clean aesthetic lines. By using water soluble plastic resin the articles can be secured to themselves or to other articles simply by wetting the formed article.

BRIEF DESCRIPTION OF THE DRAWINGS

FIG. 1 is a perspective view of a doll dressed in clothing made in accordance with the concepts of the present invention;

FIG. 2 is another perspective view of a doll dressed in garments made in accordance with the concepts of the present invention;

FIG. 3 is a front, exploded perspective view of a mold for use in accordance with the present invention to provide a pantsuit outfit for a doll;

FIG. 4 is a similar mirror exploded perspective view of a mold, having the arm portions removed, for use with the present invention to make a full length dress or skirt outfit for a doll;

FIG. 5 is a perspective view of a mold for manufacturing a hat in accordance with the concepts of the present invention;

FIG. 6 is an exploded perspective view of a mold for use in manufacturing a boot in accordance with the concepts of the present invention;

FIG. 7 is an exploded perspective view of the shoulder joint in the mold shown in FIG. 3;

FIG. 8 is a perspective view, on an enlarged scale, showing one step in the method provided by the present invention;

FIG. 9 is a view, similar to FIG. 8, showing a subsequent step of the method in which the garment is removed from the mold;

FIG. 10 shows the step of trimming the mold to the appropriate proportions for the doll to be clothed;

FIG. 11 shows the step of providing and applying buttons and pockets to the jacket shown in FIG. 10;

FIG. 12 shows a partial, perspective view of a pair of pants made according to the method of the present invention utilizing the mold of FIG. 3;

FIG. 13 is a perspective view, similar to FIG. 12 showing the foldover flap structure;

FIG. 14 is a perspective view of a "loom" wherein the liquid is applied to a textured surface to take on the same texture in a sheet of cured material;

FIG. 15 is a partial perspective view showing the provision of a different type of texture;

FIG. 16 is a reduced, front elevational view of a doll housing containing accessories made in accordance with the teachings of this invention;

FIGS. 17–21 are partial perspective views of various molds useful in the practice of this invention;

FIGS. 22 and 23 are perspective views of different cushions made in accordance with the teachings of this invention;

FIG. 24 is a cross-section taken generally along the line 22—22 in FIG. 22 or the line 23—23 in FIG. 23;

FIG. 25 is a perspective view showing a method of making a pillow;

FIG. 26 is a perspective view of a lampshade made in accordance with the present invention;

FIG. 27 is a perspective view of a picture frame made in accordance with the present invention; and FIG. 28 is an exploded, perspective view showing a method of making a pillow.

DETAILED DESCRIPTION OF THE PREFERRED EMBODIMENT

Clothing or garments for dolls made in accordance with the concepts of the present invention are shown in FIGS. 1 and 2, and generally designated by the reference numeral 10. Examples of the specific items or garments to be made in accordance with this invention include a suit jacket 12, pants 14, hat 16 and shoes 18, shown on the doll or figure toy depicted in FIG. 1. FIG. 2 shows a full length gown 20, a decorative flower 22 and open-toed shoes 24 made in accordance with this invention. The doll clothing or garments which can be made of any size are made with the use of specifically designed molds, as described hereinafter to produce the specialized clothing, as desired.

In the preferred embodiment, a liquid coating is used and applied to the exterior surfaces of the molds in order to provide clothing or other doll accessories. The particular material is preferably a spreadable, nontoxic, thermoplastic, water soluble resin which sets to form a solid plastic film within a short time period. A particularly preferred resin is polyvinyl alcohol, such as VINOL manufactured and sold by Air Products and Chemicals of Hillsdale, Ill.

Referring in more detail to the specific figures, and in particular to FIG. 3, there is shown a mold, generally designated 30, which includes an upper torso portion and a lower torso portion 34. The upper torso portion 32 includes a pair of tapered arms 36 secured to the shoulder areas of the upper torso. Each arm 36 is removably connected to the torso 32 by the connection means, generally designated 38, in FIG. 7. Each arm 36 includes a semi-circular element 40 which forms a portion of the back of the upper torso 32 when in place. The semi-circular portion 40 is connected or formed integrally with an inner flat end 42 of each arm. The semi-circular element 40 carries a generally forwardly directed connecting tab 44 in a spaced relationship with the surface 42 of the arm. The other side of the connecting means 38 provides a flat contact surface 46 for abutting the surface 42 of the arm. A generally longitudinal cutout 48 extends from the back of the torso 42 toward the front in alignment with the tab 44 so that the tab can be inserted within the cutout 48 and the arm 36 moved forwardly until the semi-circular element 40 lies flush within a complementary semi-circular aperture 50 on the rear of the torso to thereby removably mount and frictionally maintain the arm on the torso.

The torso 32 also is provided with a forwardly directed flange 52 which extends from approximately the bottom of the neck portion 54 to the bottom surface 56 of the torso 32. The flange 52 serves to facilitate the removal of the finished product or garment as described below with respect to the method. At the top of the flange 52, a raised narrow land 58 extends generally vertically upwardly and terminates at a junction with a land 60 around the neck 54 of the torso. The lands 58 and 60 also facilitate removal of the garment.

The present invention also provides a method for making doll clothing or other garments with the particular molds described in this specification. The outer coating or film is applied to the mold in a liquid condition, such as shown in FIG. 8, by a simple applicator or brush 64. The film coating 66 can be brushed or dabbed on, or applied in any other desirable manner, such as by spraying, or the like. The film covering 66 is applied to the entire surface of the mold 32 to the point, and past the point which will later be the end of the particular garment. In addition, liquid coating is applied over the flange 52 as shown at 68. The liquid coating extends past what will later be the end of the clothing to jagged ends 70 as shown in FIG. 9. Smooth garment edges are formed by rubbing a finger or implement over the top edges of the flange 52 and lands 58 and 60 to remove the resin therefrom. After the entire coating is applied to the model 32, it is permitted to set and then carefully removed from the mold as demonstrated in FIG. 9. The right side of the garment, in this case, a jacket 72, is peeled away from the flange 52 and subsequently, the right arm 36 is detached from the torso 32 to facilitate removal of the arm 36 from the finished set product.

The manner of attachment of appendages such as arms 36 to the torso 32 enables the appendages to be removed from the torso when the torso and appendages are covered by the dried film without damaging the film garment. The particular connection means 38 illustrated in FIG. 7 retains the arm 36 to the torso simply by the friction between juxtaposed surfaces such as 40 and 50, and 44 and 48 which are otherwise freely slidable with respect to one another. This insures that the arms 36 can be separated from torso 32 by applying a light separating force without the need for substantial relative motion between the torso 32 and the arms 36.

The final product or garment is flexible so that it can be easily removed and placed on dolls as shown in FIGS. 1 and 2. The final steps in the method include the trimming of the cuffs 74 by cutting the ends of the arms with a scissors 76. The lapels 78 of the jacket are formed by rolling the neck downwardly and cutting notches 80 adjacent the neck area. The open edges of the jacket 82, formed with a regular edge surface, create an overlap portion 84 which was provided by the flange 52. The overlapping portion 84 can then be tucked under, as shown in FIG. 11, to close the garment and added features such as buttons 86 and pockets 88 can be added. The pockets 88 are "sewn on" by providing a pocket panel 90 from a piece of flat "material" which has been permitted to set on a flat surface. The pocket panel 90 is cut out and then moistened which permits the water soluble pocket panel 80 to adhere to the coat 72 as shown. Thus, with the upper torso mold 32, any type of front opening garment, such as jackets, sweaters, blouses, shirts, or the like, can be manufactured in accordance with the method of the present invention.

The pair of pants 14 shown in FIG. 1 can be made with the use of the lower torso mold 34 as shown in FIG. 3. The lower torso mold includes a pair of generally large legs 90 to provide generally loose fitting pants 14 and an upper hip portion 92. The upper end of the hip portion 92 terminates in a flat surface 94 having a vertically extending post 95 thereon. The post 95 fits within a complementary aperture 96 on the bottom of the upper torso portion 32. A similar front flange 98 is provided for closing the pants and terminates at a position in contact with the bottom of the flange 52 on the upper torso portion 32. The method of the present invention permits a pair of pants 14 to be made by coating the lower torso mold 34 as described above with respect to FIGS. 8 and 9, trimming the lower edges of the pants and upper edges thereof to provide a pair of pants, the top of which are shown in FIGS. 12 and 13. A pair of flaps 100 are provided by the flange 98 and are folded one over the other, as shown in FIG. 13, to provide the finished product.

Other items, such as the gown shown in FIG. 2, which do not have an opening in the front, can be made with the use of a mold as shown in FIG. 4. The mold, again, includes an upper torso portion 102 which includes the same connecting means 38 as shown in FIG. 7, for a pair of arms. In this embodiment, the lower mold portion 104 is shaped generally like a solid skirt and mounted on a pedestal base 106 as shown. Again, the upper surface of the lower mold 104 includes a post 95 for interfitting with the aperture 96 in the upper torso portion. The upper mold 102 can be used as described with respect to FIGS. 8 and 9 to provide an upper garment which opens in the back. Suitable lands 58 and 60 facilitate removal of the garment from the mold. A rearwardly directed flange 52a provides a surface to coat for a flap and also facilitates removal of the garment from the mold. The lower mold portion 104 can be used, generally as described with respect to the mold 34, as described with respect to FIGS. 12 and 13, to provide a skirt which opens by a flap in the rear formed by the flange 98a. Of course, the upper torso portions of FIGS. 3 and 4 can be interchanged with the lower torso portions in order to make one-piece dresses, pantsuits or jumpsuits. For example, the dress 20 shown on the doll in FIG. 2 is made with the two mold portions shown in FIG. 4. The mold is coated in this case without the necessity of the arms 36 and then removed from the mold and trimmed with a slit 108 and a plunging neckline 110.

FIG. 5 shows a mold 112 for use in making the hat 16. The mold includes a semi-spherical portion 114 and an annular brim portion 116. This upper surface is coated and permitted to set and, when removed from the mold can be formed and trimmed to provide a hat 16 as shown in FIG. 1.

Similarly, FIG. 6 shows a boot mold 120 including a sole portion 122, an upper boot portion 124 and a pedestal mold mount 126. The sole portions 122 are provided by conventional means and secured to the lower surface 128 of a boot made on the mold 124. The entire mold 124 is covered with liquid material which is thereafter permitted to cure or set. The boot is removed from the mold along the flange 130 and the sole portion 122 is secured to the bottom surface defined by the surface 128 of the mold. The shoes are then trimmed and decorated to provide the open toe models 24 or regular boots 18, as shown in FIGS. 2 and 1, respectively.

Many different types of molds and mold elements are contemplated by the present invention. For example, the narrow or slim jacket arms provided by the arms 36 is but one type of arm that may be utilized with the present invention. For example, a non-tapered or stovepipe type arm can be interchangeably mounted on the mold portion 32 to provide a loose-fitting jacket sleeve for a doll. Also, a pair of arms having flared lower edges can be provided for a unique look. Similarly, the mold portion 34 provides generally baggy, loose-fitting pants for typical dolls. Very thin or tight fitting pants can be provided by the use of a mold 34 having narrow tapering leg portions 90. Since the liquid is applied to the surfaces of the mold and conforms to the exact surface, a texture can be provided on the garment by the mold. For example, a cloth-like grid or surface 134 (FIG. 4) can be provided on the entire exterior surface of the mold portion 104 to be covered by the liquid. Once the liquid sets, the surface texture 134 will be imprinted on the interior of the garment. By simply turning the "skirt" inside out for use on the doll, an innumerable number of textured surfaces can be created. Similarly, a "loom", generally designated 140 as shown in FIGS. 14 and 15 can be provided to make textured surfaces on swatches or specific sizes of material. This material can be used for add-ons such as pockets and the like or "sewn" as described above by moistening the edges to be joined. The loom 140 includes a generally rectangular pan 142 and a bottom surface or grid 144 which defines the surface or texture on the "material" to be loomed. For example, a batch of liquid can be placed in the loom 140 of FIG. 14 and evenly spread over the surface 144 by a tool 146 and then permitted to cure. Once cured, the material 146 can be removed from the mold to provide the various accessories for garments. Similarly, a different texture is provided by the surface 144 of the loom in FIG. 15. In addition, since the liquid coating material is water soluble, coloring additives can be added to the liquid prior to setting and applying to the mold to provide garments of many various colors. Similarly, colored accessories such as the pocket 90 can be made in contrasting colors with the garments to provide appealing and unusual types of clothing. Also, the same method can be used to manufacture many other items such as toy cars, airplanes, spaceships, buildings or any other object. For example, the present method and apparatus would be very desirable and easily used for the making of face masks for different types of costumes. While most of the forms shown have utilized the exterior surface as the surface to be coated, many of the particular items could be manufactured by coating the interior of suitably shaped, complementary molds which could, in addition, have self-formed therein various pockets, stitching, collars, and even the texture of the material.

A conventional open front doll house 200 is shown in FIG. 16 with a roof 202, side walls 204, rear wall 208, bottom floor 210 and second floor 212. A plurality of doll accessories made in accordance with the teachings of this invention are arranged within the house 200 including curtains 214, rugs 216, pictures 218, flooring 220, lamps 222 and pillows 224.

The curtains 214 are made in molds 226 and 228 shown in FIGS. 17 and 18. Mold 226 is useful for making curtains 214a with a valance 214b, shown in FIG. 16. Undulating portion 230 of mold 226 creates the desired surface texture and undulating shape of curtain 214a. A portion 232 connected to portion 230 along a common edge, but which is deeper and thinner across than portion 230, is used to make the valance 214b. The portions 230 and 232 are covered with liquid resin as described previously in connection with the description of FIGS. 14 and 15. When the resin dries to form a film the integral curtain and valance are removed from the mold and the intermediate portion of the film produced by portion 230 is cut out to achieve the structure shown in FIG. 16 in which spaced curtains 214a are connected by valance 214b. Curtain ties 214c can be made at the same time in mold portion 234 of mold 226. In the same way and also at the same time, if desired, smaller curtains 214d, and furniture valances 214e can be formed in portions 238 and 240 respectively of mold 226. Shower curtains 214f are produced by means of the mold shown in FIG. 18.

The same technique can be applied to the construction of rugs 216 and flooring 220. A mold shown in FIG. 19, having raised grid lines corresponding to the grout lines in conventional tile forms tile flooring 220. A mold for making a rug 216a with a textured surface is illustrated in FIG. 20 and a mold with a plurality of concentric elliptical depressions 224 for forming a throw rug 216b is illustrated in FIG. 21.

Furniture pillows 224a, 224b and 224c illustrated in FIGS. 16, 22-25 and 28 are formed with a shaped exterior surface 250, a hollow center 246 and an open side 248. The pillows 224 can assume almost any desired exterior shape including the box, disc or flattened tube shown in FIGS. 22, 23, and 25 respectively.

The method of forming the pillows 224 is illustrated in FIGS. 25 and 28. In FIG. 28, pillow 224a, suitably serving as a doll seat cushion, is made using a mold member 252a having a handle 254a connected to a mold element 256a which is disc-shaped in this embodiment. A flexible cover 258 generally conforms to the element 256a and is removably secured thereto by friction or the like. The cover 258 may be made of plastic such as polyethylene. To form the pillow 224a the cover 258, mounted on element 256a, is coated with resin as described with respect to other embodiments, while grasping the handle 254a of member 252a. When the resin is dry, the cover 258 is removed from the element 256a and flexed to facilitate separation of the pillow 224a and the cover 258. The pillow 224a which retains its molded shape without internal support is then placed on a chair with its open side 248a pointing downwardly so as not to be visible.

The pillows 224b and 224c are made in the same way as the pillow 224a using appropriately shaped mold members 252. For example bed pillow 224c is made with a mold member 252c having a handle 254c and a mold element 256c shown in FIG. 25. A cover, not shown, analogous to the cover 258 can be used in conjunction with member 252c if desired. The sides 266 and 268 of mold element 256c preferably taper outwardly from elongated pointed end 270 to a widened end 272. The molded pillow 224c is then conveniently slipped off the element 256c over end 270 as shown in FIG. 25. Again the pillow 224c possesses sufficient rigidity to maintain its molded shape in use.

Various other accessories can be made by molds of the desired shape. For example a lampshade 220 is made by coating a mold such as the one shown in FIG. 26 and picture frame 218 is made by coating the molds such as is shown in FIG. 27.

The foregoing detailed description has been given for clearness of understanding only and no unnecessary limitations should be understood therefrom as some modifications will be obvious to those skilled in the art.

We claim:

1. A method for making doll house accessories which comprises the steps of:
   providing a mold having physical dimensions similar to a portion of the accessory to be formed;
   applying a water soluble resinous film forming liquid to the surfaces of said mold;
   forming a plastic film on said surfaces by allowing said liquid to dry;
   removing the finished accessory from the mold; and
   attaching decorative elements to said plastic film by moistening the contact surface of said film to which said element is to be attached.

2. The method of claim 1 wherein the film-forming liquid is manually applied to the mold with a brush tool.

3. The method of claim 2 including the step of incorporating decorative colors in the liquid prior to application to the mold.

4. The method of claim 3 wherein said liquid is composed of polyvinyl alcohol.

5. The method of claims 1 or 2 including the step of molding a textured surface on the accessories.

6. The method of claim 1 including the step of providing the form with a raised surface to facilitate the removal of the film from the form.

7. The method of claim 6 including the step of rubbing off said liquid from said raised surface to produce a smooth edged accessory.

8. An apparatus for making doll clothing by applying a resinous liquid to the exterior thereof which dries to form a plastic film, comprising:
   a torso portion similar in size and shape to that of the doll to be clothed; and
   means for forming overlapping portions of said doll clothing, said means being connected to said torso portion and including an upstanding flange.

9. The apparatus of claim 8 including means defining a severance discontinuity to facilitate removal of the garment from the mold.

10. The apparatus of claim 8 including a brush for applying the film-forming liquid to the exterior of said mold.

11. The apparatus of claim 8 including a pair of arms for said torso and connecting means for removably mounting the arms on the torso.

12. The apparatus of claim 11 wherein said connecting means comprises a flush fitting tab extending outwardly from said arm and a complementary tab receiver in the torso to facilitate removal of the garment from the form.

13. A form for making doll clothing by applying a resinous liquid which dries to form a plastic film to the exterior of a mold portion, comprising:
   a first torso mold portion;
   at least one removably mounted appendage; and
   connecting means for permitting disconnection of said appendage from said mold portion when said portion and said appendage are covered by said film, said connecting means comprising a flush fitting tab extending outwardly from said arm and a complementary tab receiver in the torso to facilitate removal of the garment from the form.

14. The form of claim 13 including a second torso mold portion including a pair of appendages; and
   connecting means for removably connecting the first torso mold portion to the second torso mold portion.

15. The apparatus of claim 14 wherein said first and second torso mold portions include a severance discontinuity forming a continuous link between the first and second portions.

* * * * *